DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1345

T882,014

INTEGRAL SCREEN RADIOGRAPHIC ELEMENT

William Wendell Rees and Richard Karl Kurz, both % Eastman Kodak Co., Kodak Park Division, Rochester, N.Y. 14650

Filed Oct. 21, 1969, Ser. No. 868,223
**Int. Cl. G03c *1/92***
U.S. Cl. 96—82
No Drawing. 7 Pages Specification

An integral radiographic element containing a support, a silver bromoiodide emulsion layer in which said iodide comprises up to about 10 mole percent of the halide, an X-ray intensifying screen and an arrangement of distinct layers wherein said X-ray intensifying screen and a conversion material are disposed between the support and the emulsion layer is disclosed. The X-ray intensifying screen emits radiation in the electromagnetic spectrum upon exposure to X-rays, which emitted radiation the conversion material is capable of converting to radiation of longer wave lengths in the range of about 400 to about 560 m$\mu$ with a resulting improvement in contrast.

Materials which convert the normal radiation emission of barium lead sulfate in the X-ray intensifying screen to radiation of longer wave lengths can include organic or inorganic substances or mixtures thereof, such as, for example, a combination of terphenyl and 1,4-bis[2-(5-phenyloxazolyl)]-benzene, a combination of 1,1,4,4-tetraphenyl butadiene and 1,4-bis[2-(5-phenyloxazolyl)]-benzene, or zinc sulfide.

Radiographic elements improved as described can be chemically sensitized, e.g., with noble metal sensitizers alone or in combination with sulfur or selenium sensitizers. They can contain antifoggants, hardeners, plasticizers, development modifiers, coating aids and other suitable photographic addenda, such as described in U.S. Pat. 3,297,446 (columns 4–9).